United States Patent
Gerdfeldter et al.

(10) Patent No.: US 10,616,361 B2
(45) Date of Patent: Apr. 7, 2020

(54) SERVICE AWARE SWITCH-OVER OF TCP-FLOWS

(71) Applicant: Telefonaktiebolaget LM Ericsson (publ), Stockholm (SE)

(72) Inventors: Ake Gerdfeldter, Huddinge (SE); Ala Nazari, Handen (SE); Mats Persson, Jarfalla (SE); Robert Skog, Hasselby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/339,624

(22) PCT Filed: Oct. 19, 2016

(86) PCT No.: PCT/IB2016/056292
§ 371 (c)(1),
(2) Date: Apr. 4, 2019

(87) PCT Pub. No.: WO2018/073623
PCT Pub. Date: Apr. 26, 2018

(65) Prior Publication Data
US 2019/0342417 A1    Nov. 7, 2019

(51) Int. Cl.
*H04L 29/08*    (2006.01)
*H04L 29/06*    (2006.01)
(Continued)

(52) U.S. Cl.
CPC ...... *H04L 67/2814* (2013.01); *H04L 41/0681* (2013.01); *H04L 41/12* (2013.01);
(Continued)

(58) Field of Classification Search
CPC ..... H04L 45/22; H04L 45/28; H04L 41/0681; H04L 41/12; H04L 43/10; H04L 45/00;
(Continued)

(56) References Cited

U.S. PATENT DOCUMENTS 7,248,589 B2 * 7/2007 Banerjee ............... H04L 29/06
370/395.32
2001/0037387 A1 * 11/2001 Gilde .................... H04L 43/00
709/225
(Continued)

*Primary Examiner* — David R Lazaro
(74) *Attorney, Agent, or Firm* — Sage Patent Group

(57) ABSTRACT

A method is implemented by a transparent proxy to support graceful switchover in a network, where the transparent proxy proxies one or more Transmission Control Protocol (TCP) connections involving a destination Internet Protocol (IP) address. The method includes starting a switchover timer for the destination IP address in response to receiving an instruction from an Application Flow Controller (AFC) to start the switchover timer for the destination IP address and transmitting an indication to the AFC that all of the one or more TCP connections involving the destination IP address that are proxied by the transparent proxy have ended or the switchover timer for the destination IP address has expired in response to a determination that all of the one or more TCP connections involving the destination IP address that are proxied by the transparent proxy have ended or the switchover timer for the destination IP address has expired.

20 Claims, 10 Drawing Sheets

(51) Int. Cl.
  *H04L 12/24* (2006.01)
  *H04L 12/707* (2013.01)
  *H04L 12/703* (2013.01)
  *H04L 12/26* (2006.01)

(52) U.S. Cl.
  CPC .............. *H04L 45/22* (2013.01); *H04L 45/28* (2013.01); *H04L 67/148* (2013.01); *H04L 69/28* (2013.01); *H04L 43/10* (2013.01); *H04L 67/2842* (2013.01)

(58) Field of Classification Search
  CPC ......... H04L 45/02; H04L 45/38; H04L 45/50; H04L 45/70
  See application file for complete search history.

(56) References Cited

U.S. PATENT DOCUMENTS

2007/0019652 A1* 1/2007 Shand .................... H04L 45/02
  370/395.21
2016/0050131 A1* 2/2016 Zhang ................ H04L 43/0811
  370/244

* cited by examiner

SERVICE AWARE SWITCH-OVER OF TCP-FLOWS

CROSS-REFERENCE TO RELATED APPLICATIONS

This application is a national stage of International Application No. PCT/IB2016/056292, filed Oct. 19, 2016, which is hereby incorporated by reference.

TECHNICAL FIELD

Embodiments of the invention relate to the field of computer networks, and more specifically, to techniques for providing graceful switchover in a network that reduces the impact of broken Transmission Control Protocol (TCP) connections.

BACKGROUND

Software Defined Networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more controllers (also referred to as SDN controllers) that oversee the switches. SDN facilitates rapid and open innovation at the network layer by providing a programmable network infrastructure.

A network may employ a transparent proxy to enhance traffic delivery in the network. A transparent proxy intercepts traffic between two endpoints (e.g., a client and a server) to provide services that enhance traffic delivery such as transparent caching or video compression. The transparent proxy may be transparent in the sense that the endpoints may not be aware of the existence of the transparent proxy.

In an SDN network, an SDN controller may configure switches in the SDN network to direct a sample of the traffic destined for a particular destination (e.g., a server) to an Application Flow Controller (AFC). The sample of the traffic may be a portion of the traffic that is selected based on certain criteria (e.g., based on source IP address). The AFC may analyze the sampled traffic to determine the characteristics of the traffic destined for that particular destination. Based on the determined characteristics of the traffic destined for that particular destination, the AFC may determine that the traffic should be processed by a particular transparent proxy to enhance traffic delivery (e.g., transparent caching or video compression) or that the traffic should no longer be processed by a particular transparent proxy (e.g., if the traffic is currently being processed by a transparent proxy). Stated differently, the AFC may determine that the traffic destined for the particular destination should take a new path through the SDN network that includes a particular transparent proxy (or excludes a particular transparent proxy) based on the determined characteristics of the traffic. The AFC may then transmit an instruction to the SDN controller to configure the forwarding behavior of one or more switches in the SDN network to forward the traffic destined for the particular destination along the new path.

A transparent proxy may employ a split Transmission Control Protocol (TCP) connection between the endpoints (e.g., a client and a server) to provide traffic delivery enhancement services both upstream and downstream. For example, the split TCP connection may include a first TCP connection between the client and the transparent proxy and a second TCP connection between the transparent proxy and the server.

With conventional techniques, when the traffic destined for a particular destination starts taking a new path, all existing TCP connections involving that particular destination will break because the old transparent proxy that handled the existing TCP connections is no longer in the new path and the new transparent proxy or the server in the new path is not aware of the existing TCP connections and thus resets the TCP connections. This results in the TCP connections needing to be reestablished, which introduces latency and extra work load on the network and the endpoints (e.g., client and server), which can negatively impact the end-user experience.

SUMMARY

A method is implemented by a transparent proxy to support graceful switchover in a network, where the transparent proxy proxies one or more Transmission Control Protocol (TCP) connections involving a destination Internet Protocol (IP) address. The method includes receiving an instruction from an Application Flow Controller (AFC) to start a switchover timer for the destination IP address, starting the switchover timer for the destination IP address in response to receiving the instruction from the AFC to start the switchover timer for the destination IP address, determining whether all of the one or more TCP connections involving the destination IP address that are proxied by the transparent proxy have ended or the switchover timer for the destination IP address has expired, and transmitting an indication to the AFC that all of the one or more TCP connections involving the destination IP address that are proxied by the transparent proxy have ended or the switchover timer for the destination IP address has expired in response to a determination that all of the one or more TCP connections involving the destination IP address that are proxied by the transparent proxy have ended or the switchover timer for the destination IP address has expired.

A method is implemented by an Application Flow Controller (AFC) to initiate graceful switchover in a network. A current path in the network to reach a destination Internet Protocol (IP) address includes a transparent proxy, where the transparent proxy proxies one or more Transmission Control Protocol (TCP) connections involving the destination IP address. The method includes transmitting an instruction to the transparent proxy in the current path to start a switchover timer for the destination IP address in response to a determination that traffic destined for the destination IP address is to take a new path that is different from the current path to reach the destination IP address, receiving an indication from the transparent proxy in the current path that all of the one or more TCP connections involving the destination IP address that are proxied by the transparent proxy have ended or the switchover timer for the destination IP address has expired, and transmitting an instruction to a Software Defined Networking (SDN) controller to configure a forwarding behavior of one or more switches to forward the traffic destined for the destination IP address along the new path in response to receiving the indication from the transparent proxy in the current path that all of the one or more TCP connections involving the destination IP address that are proxied by the transparent proxy have ended or the switchover timer for the destination IP address has expired.

A network device configured to function as a transparent proxy to support graceful switchover in a network, where the transparent proxy proxies one or more Transmission Control Protocol (TCP) connections involving a destination Internet Protocol (IP) address. The network device includes a set of one or more processors and a non-transitory machine-readable storage medium having stored therein a switchover component. The switchover component, when executed by the set of one or more processors, causes the network device to receive an instruction from an Application Flow Controller (AFC) to start a switchover timer for the destination IP address, start the switchover timer for the destination IP address in response to receiving the instruction from the AFC to start the switchover timer for the destination IP address, determine whether all of the one or more TCP connections involving the destination IP address that are proxied by the transparent proxy have ended or the switchover timer for the destination IP address has expired, and transmit an indication to the AFC that all of the one or more TCP connections involving the destination IP address that are proxied by the transparent proxy have ended or the switchover timer for the destination IP address has expired in response to a determination that all of the one or more TCP connections involving the destination IP address that are proxied by the transparent proxy have ended or the switchover timer for the destination IP address has expired.

A network device configured to function as an Application Flow Controller (AFC) to initiate graceful switchover in a network. A current path in the network to reach a destination Internet Protocol (IP) address includes a transparent proxy, where the transparent proxy proxies one or more Transmission Control Protocol (TCP) connections involving the destination IP address. The network device includes a set of one or more processors and a non-transitory machine-readable storage medium having stored therein a switchover component. The switchover component, when executed by the set of one or more processors, causes the network device to transmit an instruction to the transparent proxy in the current path to start a switchover timer for the destination IP address in response to a determination that traffic destined for the destination IP address is to take a new path that is different from the current path to reach the destination IP address, receive an indication from the transparent proxy in the current path that all of the one or more TCP connections involving the destination IP address that are proxied by the transparent proxy have ended or the switchover timer for the destination IP address has expired, and transmit an instruction to a Software Defined Networking (SDN) controller to configure a forwarding behavior of one or more switches to forward the traffic destined for the destination IP address along the new path in response to receiving the indication from the transparent proxy in the current path that all of the one or more TCP connections involving the destination IP address that are proxied by the transparent proxy have ended or the switchover timer for the destination IP address has expired.

A non-transitory machine-readable medium has computer code stored therein, which when executed by a set of one or more processors of a network device functioning as a transparent proxy, causes the network device to perform operations for supporting graceful switchover in a network, where the transparent proxy proxies one or more Transmission Control Protocol (TCP) connections involving a destination Internet Protocol (IP) address. The operations include receiving an instruction from an Application Flow Controller (AFC) to start a switchover timer for the destination IP address, starting the switchover timer for the destination IP address in response to receiving the instruction from the AFC to start the switchover timer for the destination IP address, determining whether all of the one or more TCP connections involving the destination IP address that are proxied by the transparent proxy have ended or the switchover timer for the destination IP address has expired, and transmitting an indication to the AFC that all of the one or more TCP connections involving the destination IP address that are proxied by the transparent proxy have ended or the switchover timer for the destination IP address has expired in response to a determination that all of the one or more TCP connections involving the destination IP address that are proxied by the transparent proxy have ended or the switchover timer for the destination IP address has expired.

A non-transitory machine-readable medium has computer code stored therein, which when executed by a set of one or more processors of a network device functioning as an Application Flow Controller (AFC), causes the network device to perform operations for initiating graceful switchover in a network. A current path in the network to reach a destination Internet Protocol (IP) address includes a transparent proxy, where the transparent proxy proxies one or more Transmission Control Protocol (TCP) connections involving the destination IP address. The operations include transmitting an instruction to the transparent proxy in the current path to start a switchover timer for the destination IP address in response to a determination that traffic destined for the destination IP address is to take a new path that is different from the current path to reach the destination IP address, receiving an indication from the transparent proxy in the current path that all of the one or more TCP connections involving the destination IP address that are proxied by the transparent proxy have ended or the switchover timer for the destination IP address has expired, and transmitting an instruction to a Software Defined Networking (SDN) controller to configure a forwarding behavior of one or more switches to forward the traffic destined for the destination IP address along the new path in response to receiving the indication from the transparent proxy in the current path that all of the one or more TCP connections involving the destination IP address that are proxied by the transparent proxy have ended or the switchover timer for the destination IP address has expired.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
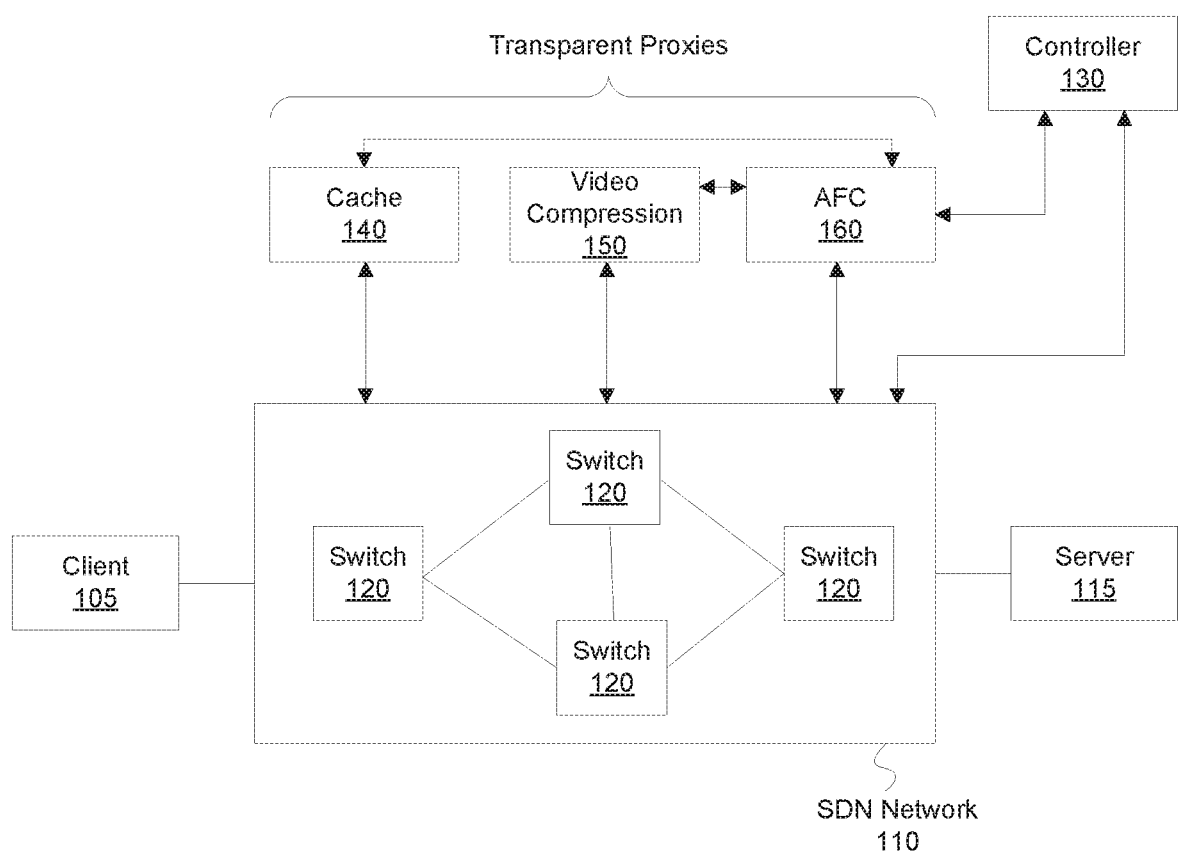
FIG. 1 is a block diagram of a network in which graceful switchover can be implemented, according to some embodiments.

The following description describes methods and apparatus for supporting graceful switchover in a network that reduces the impact of broken Transmission Control Protocol (TCP) connections. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, in a Software Defined Networking (SDN) network, an SDN controller may configure switches in the SDN network to direct a sample of the traffic destined for a particular destination to an Application Flow Controller (AFC). The AFC may analyze the sampled traffic to determine the characteristics of the traffic destined for that particular destination. Based on the determined characteristics of the traffic destined for that particular destination, the AFC may determine that the traffic should be processed by a particular transparent proxy to enhance traffic delivery (e.g., transparent caching or video compression) or that the traffic should no longer be processed by a particular transparent proxy (e.g., if the traffic was already being processed by a transparent proxy). Stated differently, the AFC may determine that the traffic destined for the particular destination should take a new path through the SDN network that includes a particular transparent proxy (or excludes a particular transparent proxy) based on the determined characteristics of the traffic. The AFC may then transmit an instruction to the SDN controller to configure the forwarding behavior of one or more switches in the SDN network to forward the traffic destined for the particular destination along the new path.

A transparent proxy may employ a split TCP connection between the endpoints (e.g., a client and a server) to provide traffic delivery enhancement services both upstream and downstream. For example, the split TCP connection may include a first TCP connection between the client and the transparent proxy and a second TCP connection between the transparent proxy and the server.

With conventional techniques, when the traffic destined for a particular destination starts taking a new path, all existing TCP connections involving that destination will break because the old transparent proxy that handled the existing TCP connections is no longer in the new path and the new transparent proxy or the server in the new path is not aware of the existing TCP connections and thus resets the TCP connections. This results in the TCP connections needing to be reestablished, which introduces latency and extra work load on the network, which can negatively impact the end-user experience.

Embodiments described herein overcome some of the disadvantages of conventional techniques by introducing the concept of a switchover timer for a destination IP address. According to some embodiments, when the AFC determines that the traffic destined for a destination IP address (e.g., packets with destination IP address as the destination) should take a new path, the AFC transmits an instruction to the transparent proxy in the current path to start a switchover timer for the destination IP address. Upon receiving the instruction to start the switchover timer for the destination IP address, the transparent proxy starts the switchover timer and waits for all of the existing TCP connections involving the destination IP address that are proxied by the transparent proxy to end or for the switchover timer to expire, whichever occurs first. In one embodiment, once the transparent proxy starts the switchover timer, the transparent proxy relays any new TCP connections involving the destination IP address instead of proxying them. If the transparent proxy determines that all of the existing TCP connections involving the destination IP address that are proxied by the TCP connection have ended or the switchover timer has expired, the transparent proxy transmits an indication to the AFC as such. Upon receiving such indication, the AFC may transmit an instruction to the SDN controller to configure the forwarding behavior of one or more switches in the SDN network to forward the traffic destined for the destination IP address along the new path. Any traffic transmitted over existing relayed TCP connections (e.g., TCP connections that were established after the switchover timer started but before switchover to the new path occurred) can take the new path (which may include a different transparent proxy) without traffic disturbance. In this way, any existing TCP connections involving the destination IP address that are proxied by the transparent proxy are given a chance to end before switchover to the new path occurs, thereby allowing for a graceful switchover to the new path. Other embodiments are also described herein.

FIG. 1 is a block diagram of a network in which graceful switchover can be implemented, according to some embodiments. As shown in the diagram, the network includes a client 105 and a server 115 that are communicatively coupled over an SDN network 110. The SDN network 110 may include a data plane and a control plane. The data plane (sometimes referred to as the forwarding plane) of the SDN network 110 includes one or more switches 120 and is responsible for forwarding packets in the data plane based on instructions received from the control plane. The control plane of the SDN network includes an SDN controller 130 and is responsible for configuring the forwarding behavior of the switches 120 in the data plane of the SDN network 110. As shown in the diagram, the SDN network 110 includes four switches 120 that are communicatively coupled (e.g., over wired or wireless communications links—depicted as lines connecting the switches 120) in a particular configuration. However, it should be understood that the SDN network 110 can include any number of switches 120 that are communicatively coupled in any suitable configuration. In one embodiment, the SDN controller 130 communicates with the switches 120 through a southbound interface using a southbound protocol such as OpenFlow.

As shown in the diagram, the SDN network 110 is communicatively coupled to one or more transparent proxies including a cache proxy 140, a video compression proxy 150, and an AFC 160. The cache proxy 140 is a transparent proxy that provides caching services. The video compression proxy 150 is a transparent proxy that provides video compression services. The transparent proxies may be transparent in the sense that the endpoints (e.g., the client 105 and the server 115) may not be aware of the existence of the transparent proxies. These transparent proxies are provided by way of example and not limitation. It should be understood that the SDN network 110 can be communicatively coupled to different types of transparent proxies than shown in the diagram. Also, it should be understood that the transparent proxies can reside within the SDN network 110.

The AFC 160 is communicatively coupled to the SDN controller 130 and to one or more of the other transparent proxies (e.g., to the cache proxy 140 and the video compression proxy 150). In one embodiment, the AFC 160 communicates with the SDN controller 130 through a northbound interface using a northbound protocol such as Apache Thrift. As will be described in additional detail below, the AFC 160 may analyze a sample of the traffic destined for a particular destination to determine the characteristics of the traffic destined for that particular destination. Based on the determined characteristics of the traffic destined for that particular destination, the AFC 160 may determine that the traffic destined for that particular destination should be processed by a particular transparent proxy to enhance traffic delivery or that the traffic should no longer be processed by a particular transparent proxy (e.g., if the traffic is currently being processed by a transparent proxy). Stated differently, the AFC 160 may determine that the traffic destined for the particular destination should take a new path through the SDN network 110 that includes a particular transparent proxy (or excludes a particular transparent proxy) based on the determined characteristics of the traffic. For example, if the AFC 160 determines that a significant portion of the traffic destined for the server 115 is video traffic, then the AFC 160 may determine that the traffic destined for the server 115 should be processed by the video compression proxy 150 for video compression. As another example, if the AFC 160 determines that the traffic destined for the server 115 is experiencing unusual delay, then the AFC 160 may determine that the traffic destined for the server 115 should be processed by the cache proxy 140 for caching.

In one embodiment, when the AFC 160 determines that the traffic destined for a destination IP address should take a new path, the AFC 160 transmits an instruction to the transparent proxy in the current path to start a switchover timer for the destination IP address. Upon receiving the instruction to start the switchover timer for the destination IP address, the transparent proxy starts the switchover timer and waits for all of the existing TCP connections involving the destination IP address that are proxied by the transparent proxy to end or for the switchover timer to expire, whichever occurs first. If the transparent proxy determines that all of the existing TCP connections involving the destination IP address that are proxied by the transparent proxy have ended or the switchover timer has expired, the transparent proxy transmits an indication to the AFC 160 that all of the existing TCP connections involving the destination IP address that are proxied by the transparent proxy have ended or the switchover timer has expired. Upon receiving such indication, the AFC 160 may transmit an instruction to the SDN controller 130 to configure the forwarding behavior of one or more switches 120 in the SDN network 110 to forward the traffic destined for the destination IP address along the new path. In this way, any existing TCP connections involving the destination IP address that are proxied by the transparent proxy are given a chance to end before switchover to the new path occurs, thereby allowing for a graceful switchover to the new path. This is contrast to conventional techniques that do not give existing TCP connections a chance to end before switchover to the new path occurs.

Figure 2:
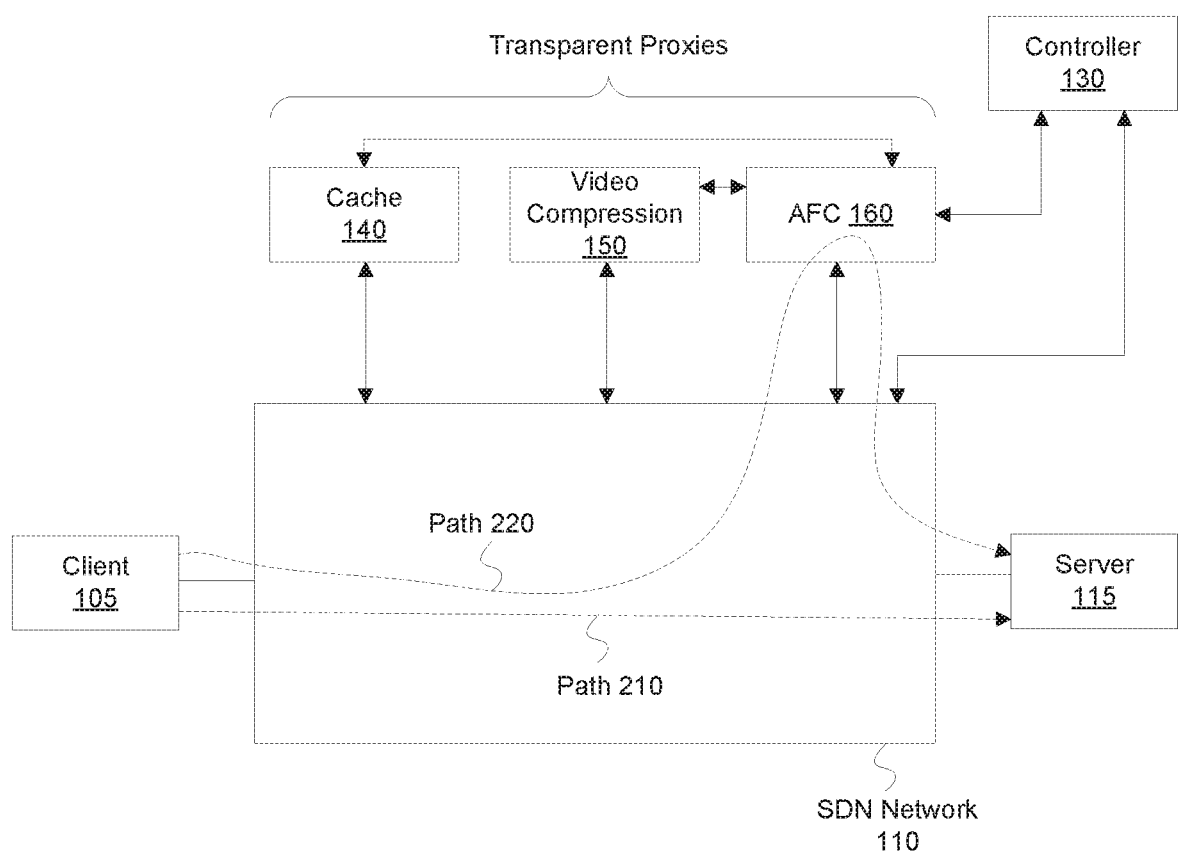
FIG. 2 is a diagram illustrating an initial traffic path to a server, according to some embodiments.

FIG. 2 is a diagram illustrating an initial traffic path to a server, according to some embodiments. In this exemplary diagram, the client 105 generates traffic that is destined for the server 115 (e.g., the traffic is destined for the IP address of the server 115). Initially, the switches 120 in the SDN network 110 (which are omitted from the diagram to avoid obscuring the diagram) may be configured to forward the traffic destined for the server 115 along a path that does not include any transparent proxies. As such, the traffic from the client 105 to the server 115 may take a path 210 through the SDN network 110 that does not include any transparent proxies. In one embodiment, the SDN controller 130 configures the forwarding behavior of one or more switches 120 in the SDN network 110 to direct a sample of the traffic destined for the server 115 to the AFC 160. The sample of the traffic may be a portion of the traffic destined for the server 115 that is selected based on certain criteria (e.g., defined by a network operator). For example, the selection can be based on source IP address. In the example shown in the diagram, traffic generated by the client 105 is selected to be part of the sampled traffic. As such, the traffic from the client 105 to the server 115 may take a path 220, which includes the AFC. Traffic generated by other clients (and destined for the server 115) may also be directed to the AFC 160 as part of the sampled traffic and is not shown in the diagram to avoid obscuring the diagram. The AFC 160 may analyze the sampled traffic to determine the characteristics of the traffic destined for the server 115. Based on the determined characteristics of the traffic destined for the server 115, the AFC 160 may determine that the traffic destined for the server 115 should be processed by a particular transparent proxy to enhance traffic delivery. For example, if the AFC 160 determines that a significant portion of the traffic destined for the server 115 is video traffic, then the AFC 160 may determine that the traffic destined for the server 115 should be processed by the video compression proxy 150 for video compression. As another example, if the AFC 160 determines that the traffic destined for the server 115 is experiencing unusual delay, then the AFC 160 may determine that the traffic destined for the server 115 should be processed by the cache proxy 140 for caching. The AFC 160 may then transmit an instruction to the SDN controller 130 to configure the forwarding behavior of one or more switches 120 in the SDN network 110 to forward traffic destined for the server 115 along a new path that includes the appropriate transparent proxy.

Figure 3:
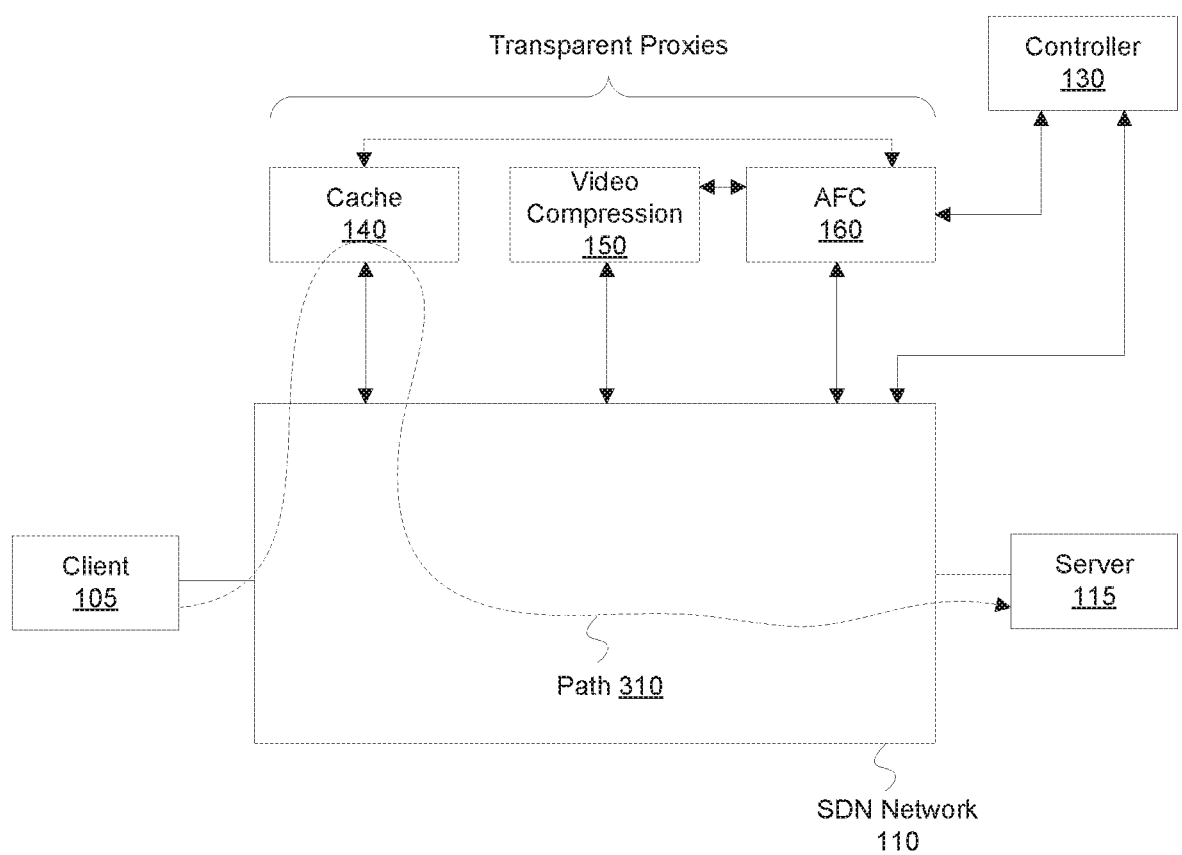
FIG. 3 is a diagram illustrating a path to the server that includes a cache proxy, according to some embodiments.

FIG. 3 is a diagram illustrating a path to the server that includes a cache proxy, according to some embodiments. In this example, the AFC 160 determines that the traffic destined for the server 115 is experiencing unusual delay and thus should be processed by the cache proxy 140. The AFC 160 thus transmits an instruction to the SDN controller 130 to configure the forwarding behavior of one or more switches 120 in the SDN network 110 to forward the traffic destined for the server 115 along a path that includes the cache proxy 140. As a result, the traffic from the client 105 to the server 115 takes a path 310, which includes the cache proxy 140. Other traffic destined for the server 115 (e.g., generated by other clients) may also take a new path that includes the cache proxy 140. In this way, the traffic destined for the server 115 is cached by the cache proxy 140 to enhance traffic delivery. It should be noted that even after the traffic destined for the server 115 takes the new path, the AFC 160 may continue to receive samples of the traffic destined for the server 115 (e.g., from client 105 and/or other clients). This allows the AFC 160 to monitor any changes in the characteristics of the traffic destined for the server 115 (and initiate switchover to a new path, if needed).

In one embodiment, the client 105 and the server 115 establish a TCP connection with each other and communicate over this TCP connection. A TCP connection provides reliable, ordered, and error-checked delivery of data between endpoints. In one embodiment, the TCP connection between the client 105 and the server 115 is a split TCP connection. For example, the cache proxy 140 may split the TCP connection between the endpoints (e.g., the client 105 and the server 115) to provide caching services both upstream and downstream. For example, the split TCP connection may include a first TCP connection between the client 105 and the cache proxy 140 and a second TCP connection between the cache proxy 140 and the server 115.

Figure 4:
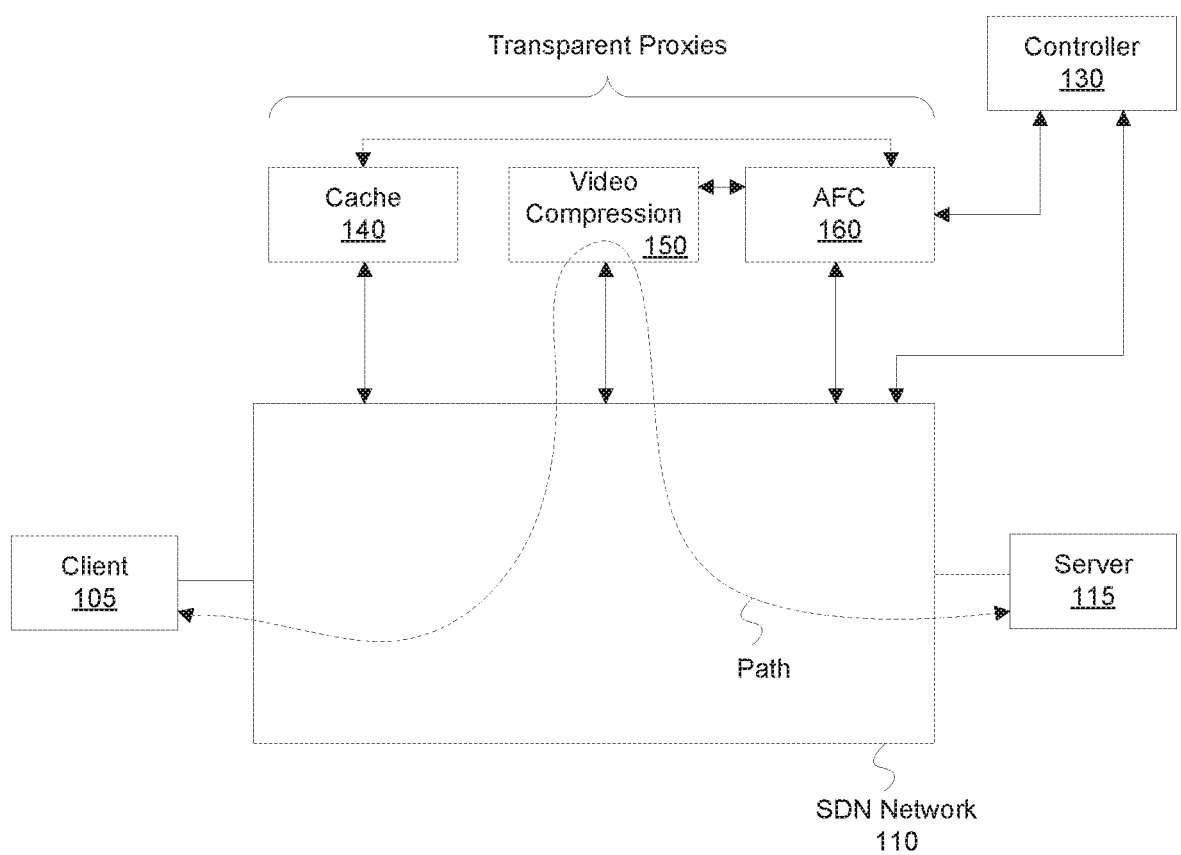
FIG. 4 is a diagram illustrating a path to the server that includes a video compression proxy, according to some embodiments.

FIG. 4 is a diagram illustrating a path to the server that includes a video compression proxy, according to some embodiments. Continuing with the example described above with reference to FIG. 3, the AFC 160 may subsequently determine that a significant portion of the traffic destined for the server 115 is video traffic and thus the traffic should take a path that includes the video compression proxy 150 instead of taking a path that includes the cache proxy 140. With conventional techniques, in this scenario, the AFC 160 immediately transmits an instruction to the SDN controller 130 to configure the forwarding behavior of one or more switches 120 in the SDN network 110 to forward traffic destined for the server 115 along a new path that includes the video compression proxy 150 (e.g., traffic from client 105 to server 115 takes path 410, which includes the video compression proxy 150). A disadvantage of the conventional technique is that any existing TCP connections involving the server 115 are broken because the old transparent proxy that handled the existing TCP connections (e.g., the cache proxy 140) is no longer in the new path and the new transparent proxy (e.g., the video compression proxy 150) is not aware of the existing TCP connections and thus resets the TCP connections.

Embodiments described herein may minimize or reduce the impact of broken TCP connections by introducing the concept of a switchover timer for a destination IP address. According to some embodiments, when the AFC 160 determines that the traffic destined for a destination IP address is to take a new path, the AFC 160 transmits an instruction to the transparent proxy in the current path to start a switchover timer for the destination IP address. Upon receiving the instruction to start the switchover timer for the destination IP address, the transparent proxy starts the switchover timer and waits for all of the existing TCP connections involving the destination IP address that are proxied by the transparent proxy to end or for the switchover timer to expire, whichever occurs first. If the transparent proxy determines that all of the existing TCP connections involving the destination IP address that are proxied by the transparent proxy have ended or the switchover timer has expired, the transparent proxy transmits an indication to the AFC 160 that all of the existing TCP connections involving the destination IP address that are proxied by the transparent proxy have ended or the switchover timer has expired. Upon receiving such indication, the AFC 160 may transmit an instruction to the SDN controller 130 to configure the forwarding behavior of one or more switches 120 in the SDN network 110 to forward the traffic destined for the destination IP address along the new path. In this way, any existing TCP connections involving the destination IP address that are proxied by the transparent proxy are given a chance to end gracefully before switchover to the new path occurs.

Figure 5:
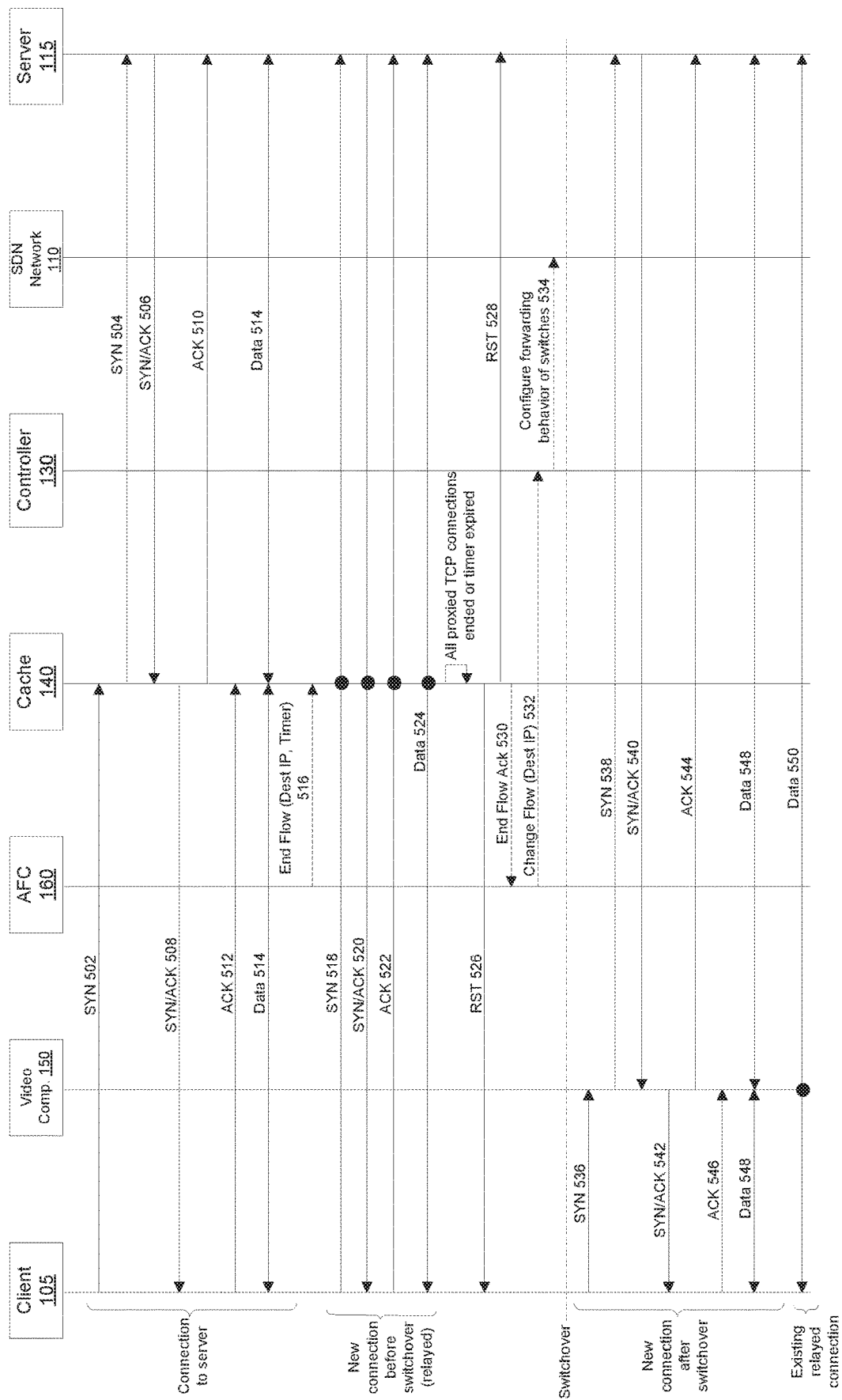
FIG. 5 is a timing diagram illustrating operations of a graceful switchover procedure, according to some embodiments.

FIG. 5 is a timing diagram illustrating operations of a graceful switchover procedure, according to some embodiments. In this exemplary timing diagram, the switches 120 in the SDN network 110 are initially configured to forward the traffic destined for the server 115 along a path that includes the cache proxy 140. As shown in the diagram, the client 105 may initiate establishment of a TCP connection with the server 115 (e.g., by initiating a TCP handshake). The cache proxy 140 proxies this TCP connection by employing a split TCP connection between the client 105 and the server 115, where the split TCP connection includes a first TCP connection between the client 105 and the cache proxy 140 and a second TCP connection between the cache proxy 140 and the server 115. SYN 502, SYN/ACK 508, and ACK 512 messages are exchanged between the client 105 and the cache proxy 140 to establish the first TCP connection of the split connection. Also, SYN 504, SYN/ACK 506, and ACK 510 messages are exchanged between the cache proxy 140 and the server 115 to establish the second TCP connection of the split connection. The split TCP connection allows the client 105 and the server 115 to exchange data traffic 514 over the TCP connection, where the data traffic 514 is processed by the cache proxy 140.

Subsequently, the AFC 160 may determine that the traffic destined for the server 115 should be processed by the video compression proxy 150 instead of the cache proxy 140. This determination can be made based on analyzing samples of the traffic destined for the server 115. Upon determining that the traffic destined for the server 115 should be processed by the video compression proxy 150 instead of the cache proxy 140, the AFC 160 transmits an End Flow message 516 to the cache proxy 140. The End Flow message 516 may include an indication of a destination IP address (Dest IP) and a switchover timer length (Timer). The End Flow message 516 conveys to the cache proxy 140 that the cache proxy 140 is to start a switchover timer for the destination IP address, where the switchover timer expires after the switchover timer length. In this example, the destination IP address is set to be the IP address of the server 115. In response to receiving this End Flow message 516, the cache proxy 140 starts the switchover timer and waits either for all of the existing TCP connections involving the server 115 that are proxied by the cache proxy 140 to end or for the switchover timer to expire, whichever occurs first. This gives the existing TCP connections involving the server 115 that are proxied by the cache proxy 140 a chance to gracefully end before switchover occurs.

In one embodiment, once the cache proxy 140 starts the switchover timer (for the IP address of the server 115), the cache proxy 140 relays any new TCP connections involving the server 115 instead of proxying them. As used herein, when a transparent proxy (e.g., cache proxy 140) relays a TCP connection, it is meant that the transparent proxy acts as an IP router with respect to the TCP connection (e.g., forwards the TCP segments for the TCP connection) instead of acting as a transparent proxy with respect to the TCP connection. As shown in the diagram, before switchover occurs, the client 105 may initiate establishment of a new TCP connection with the server 115 (e.g., by initiating a TCP handshake). The cache proxy 140 relays this new TCP connection instead of proxying it. For example, when the client 105 transmits a SYN message 518 towards the server 115, the cache proxy 140 forwards the SYN message 518 towards the server 115 without performing any transparent proxy functions (as depicted by the dot, as opposed to an arrow). In a similar manner, the cache proxy 140 also forwards the SYN/ACK message 520 and the ACK message 522 that are exchanged between the client 105 and the server 115 (without performing any transparent proxy functions). This handshake establishes a TCP connection between the client 105 and the server 115 that allows the client 105 and the server 115 to exchange data traffic 524 over the TCP connection. It should be noted that since this TCP connection is relayed by the cache proxy 140, this TCP connection does not benefit from the caching services provided by the cache proxy 140. However, this may be considered acceptable, as the alternative would be to drop the TCP connection.

Subsequently, the cache proxy 140 may determine that all of the TCP connections involving the server 115 that are proxied by the cache proxy 140 have ended or that the switchover timer (for the IP address of the server 115) has expired. If there are still some TCP connections involving the server 115 that are proxied by the cache proxy 140 that have not ended (e.g., that are still alive) by the time the switchover timer expires, the cache proxy 140 terminates these TCP connections by transmitting RST messages (e.g., RST messages 526 and 528) for these TCP connections. The cache proxy 140 then transmits an End Flow Ack message 530 to the AFC 160. The End Flow Ack message 530 conveys to the AFC 160 that all of the TCP connections involving the server 115 that are proxied by the cache proxy 140 have ended or the switchover timer has expired. In response to receiving the End Flow Ack message 530, the AFC 160 transmits an instruction to the SDN controller 130 to configure the forwarding behavior (operation 534) of one or more switches 120 in the SDN network 110 to forward the traffic destined for the server 115 along a new path that includes the video compression proxy 150. This completes the switchover to the new path.

As shown in the diagram, after switchover to the new path occurs, the client 105 may initiate establishment of a new TCP connection with the server 115. The video compression proxy 150 proxies this TCP connection by employing a split TCP connection between the client 105 and the server 115, where the split TCP connection includes a first TCP connection between the client 105 and the video compression proxy 150 and a second TCP connection between the video compression proxy 150 and the server 115. SYN 536, SYN/ACK 542, and ACK 546 messages are exchanged between the client 105 and the video compression proxy 150 to establish the first TCP connection of the split connection. Also, SYN 538, SYN/ACK 540, and ACK 544 messages are exchanged between the video compression proxy 150 and the server 115 to establish the second TCP connection of the split connection. The split TCP connection allows the client 105 and the server 115 to exchange data traffic over the TCP connection, where the data traffic 548 is processed by the video compression proxy 150.

It should be noted that traffic (e.g., data traffic 550) transmitted over any existing relayed TCP connections (e.g., TCP connections that were established after the switchover timer started but before switchover to the new path occurred—and were previously being relayed by the cache proxy 140) can take the new path including the video compression proxy 150 without traffic disturbance, as the video compression proxy 150 can relay these TCP connections.

Figure 6:
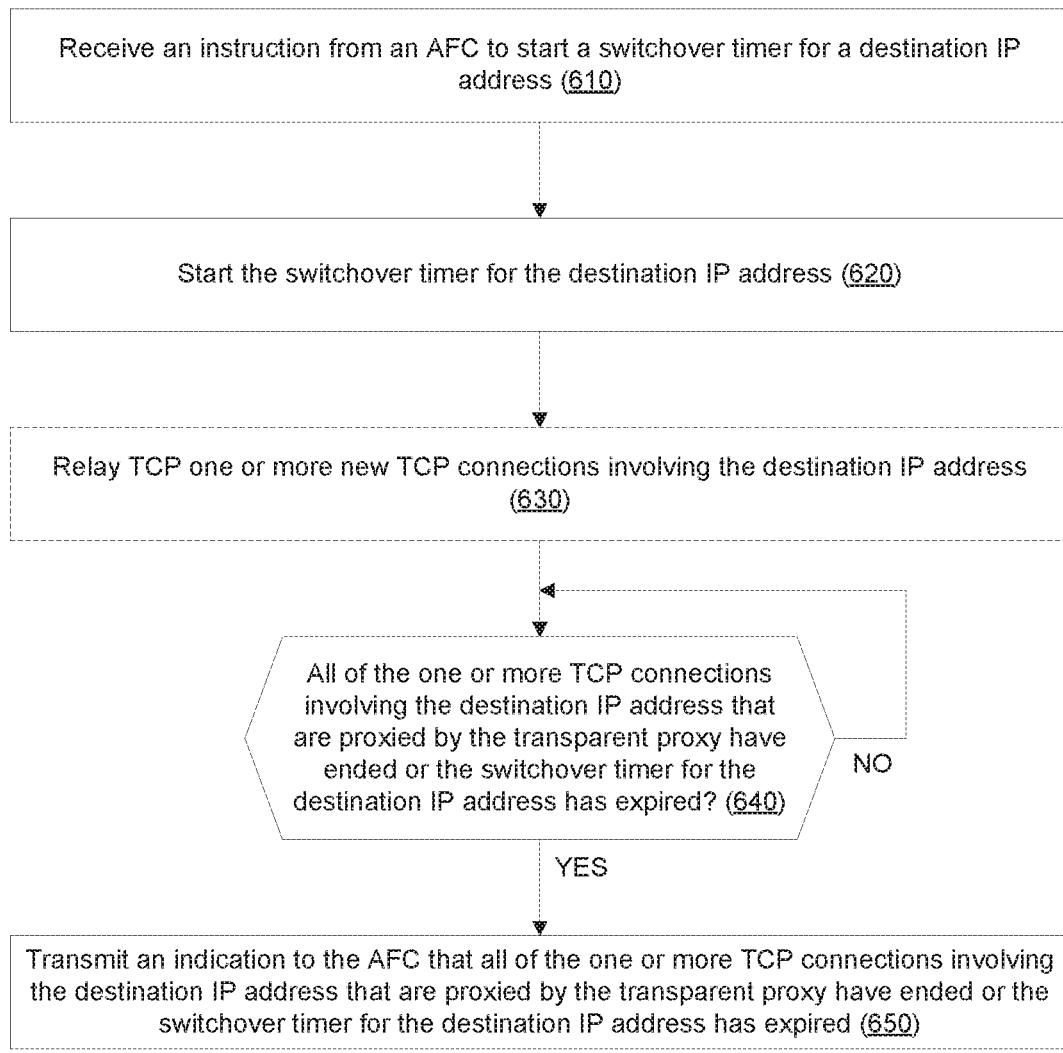
FIG. 6 is a flow diagram of a process for supporting graceful switchover, according to some embodiments.

FIG. 6 is a flow diagram of a process for supporting graceful switchover, according to some embodiments. In one embodiment, the process is implemented by a network device functioning as a transparent proxy. The transparent proxy may proxy one or more TCP connections involving a destination IP address (e.g., destination IP address is an endpoint of the TCP connection). In one embodiment, the transparent proxy provides caching services (e.g., cache proxy 140) or video compression services (e.g., video compression proxy 150). The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the transparent proxy receives an instruction from an AFC 160 to start a switchover timer for a destination IP address (block 610). In one embodiment, the instruction to start the switchover timer includes an indication of a switchover timer length. The switchover timer length may indicate when the switchover timer expires. For example, the switchover timer length may be indicated as a length of time after which the switchover timer expires. In response to receiving the instruction to start the switchover timer for the destination IP address, the transparent proxy starts the switchover timer for the destination IP address (block 620).

In one embodiment, the transparent proxy relays one or more new TCP connections involving the destination IP address that are received after the switchover timer for the destination IP address has started. This may involve forwarding TCP segments for the TCP connection towards their destination (e.g., acting as an IP router) without performing any transparent proxy functions. In one embodiment, the TCP segments for the TCP connection may include a TCP handshake message (e.g., SYN, SYN/ACK, and/or ACK message), a TCP data messages (e.g., TCP segment carrying user data), and/or a TCP connection termination messages (e.g., FIN message).

The transparent proxy determines whether all of the one or more TCP connections involving the destination IP address that are proxied by the transparent proxy have ended or the switchover timer for the destination IP address has expired (decision block 640). In one embodiment, the transparent proxy keeps track of the number of the one or more TCP connections involving the destination IP address that are proxied by the transparent proxy that are alive. In one embodiment, the transparent proxy may determine whether all of the one or more TCP connections involving the destination IP address that are proxied by the transparent proxy have ended based on a determination that the number of the one or more TCP connections involving the destination IP address that are proxied by the transparent proxy that are alive is zero.

If the transparent proxy determines that all of the one or more TCP connections involving the destination IP address that are proxied by the transparent proxy have not yet ended and the switchover timer for the destination IP address has yet to expire, the transparent proxy continues to wait for one of these events to occur. Returning to decision block 640, if the transparent proxy determines that all of the one or more TCP connections involving the destination IP address that are proxied by the transparent proxy have ended or the switchover timer for the destination IP address has expired, the transparent proxy transmits an indication to the AFC 160 that all of the one or more TCP connections involving the destination IP address that are proxied by the transparent proxy have ended or the switchover timer for the destination IP address has expired (block 650). In one embodiment, if the transparent proxy determines that there are still some TCP connections involving the destination IP address that are proxied by the transparent proxy that have not ended by the time the switchover timer expires, the transparent proxy terminates these TCP connections (e.g., by transmitting a RST message for these TCP connections).

In one embodiment, a TCP connection involving the destination IP address that is proxied by the transparent proxy is a split TCP connection that includes a first TCP connection between a client network device (e.g., client 105) and the transparent proxy and a second TCP connection between the transparent proxy and a server network device (e.g., server 115) (that is associated with the destination IP address). In one embodiment, the transparent proxy forwards TCP segments that are received out of state (e.g., without an in initial TCP connection setup (e.g., TCP handshake)) without triggering a TCP reset of the TCP connection that is received out of state. This may allow the transparent proxy to relay existing relayed TCP connections when the transparent proxy is in the new path after a switchover.

Figure 7:
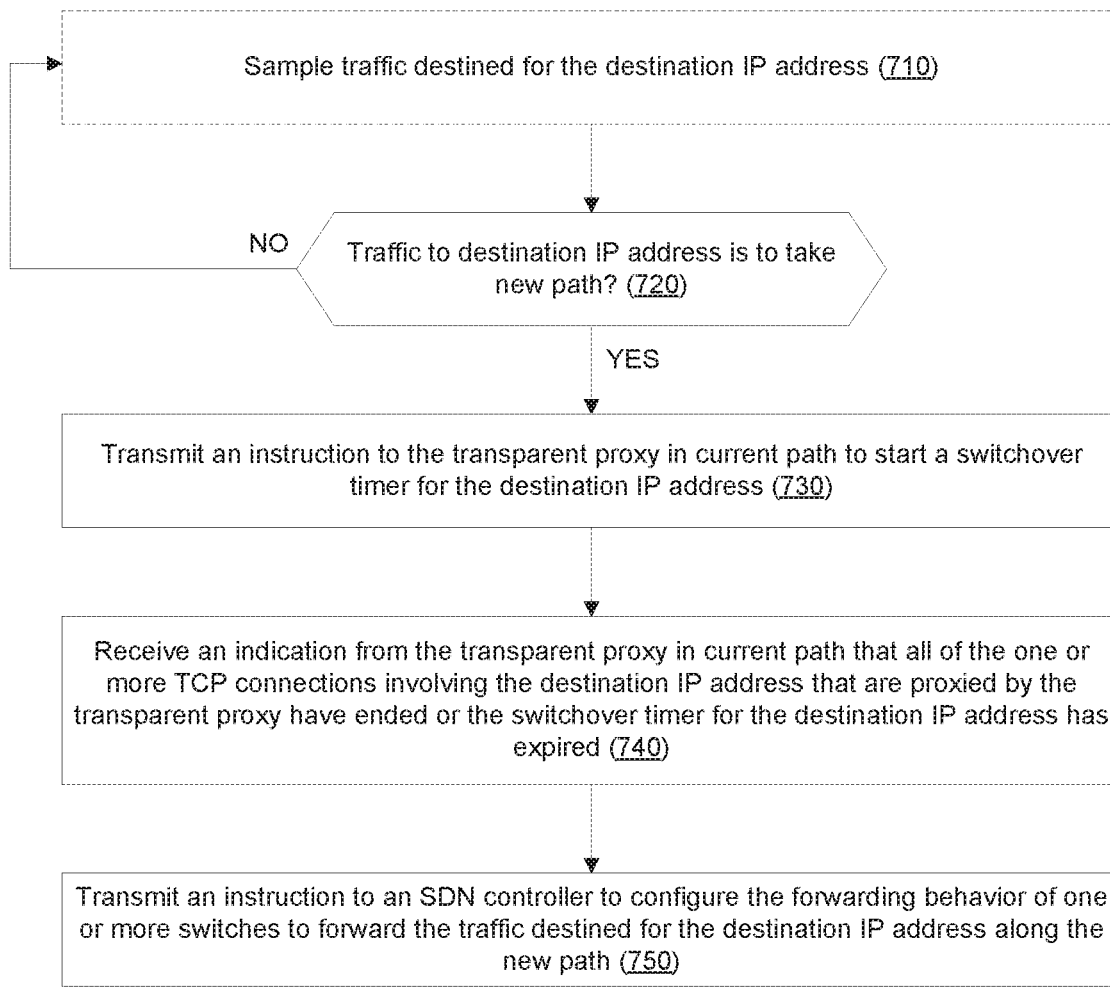
FIG. 7 is a flow diagram of a process for initiating graceful switchover, according to some embodiments.

FIG. 7 is a flow diagram of a process for initiating graceful switchover, according to some embodiments. In one embodiment, the process is implemented by a network device functioning as an AFC 160. The AFC 160 may be communicatively coupled to a transparent proxy (e.g., cache proxy 140) that is in a current path to reach a destination IP address, where the transparent proxy proxies one or more TCP connections involving the destination IP address.

In one embodiment, the process is initiated when the AFC 160 samples the traffic destined for the destination IP address (block 710) and analyzes the sampled traffic to determine the characteristics of the traffic destined for the destination IP address. Based on the analysis of the sampled traffic and pre-configured policy (e.g., defined by a network operator), the AFC 160 may determine whether the traffic destined for the destination IP address is to take a new path that is different from the current path to reach the destination IP address (decision block 720). If the AFC 160 determines that the traffic destined for the destination IP address is to continue taking the current path (and not take a new path), then the AFC 160 may continue to sample the traffic destined for the destination IP address. However, if the AFC 160 determines that the traffic destined for the destination IP address is to take a new path, then the AFC 160 transmits an instruction to the transparent proxy in the current path to start a switchover timer for the destination IP address (block 730). In one embodiment, the instruction to start the switchover timer includes an indication of a switchover timer length, which indicates when the switchover timer expires. In one embodiment, the switchover timer length is indicated as being zero (or other predetermined value) to cause an immediate switchover (e.g., if relayed TCP connections are not an option).

In one embodiment, the new path includes another transparent proxy that is to proxy TCP connections involving the destination IP address. For example, if the current path includes a cache proxy 140, then the new path may include a video compression proxy 150 instead of the cache proxy 140 (so that video compression services are applied to the traffic instead of caching services). In one embodiment, in response to a determination that the traffic destined for the destination IP address is to take the new path, the AFC 160 stores an indication of the transparent proxy in the new path. This allows the AFC 160 to remember which transparent proxy is in the current path to the destination IP address so that it knows which transparent proxy to contact when another switchover occurs.

Subsequently, the AFC 160 may receive an indication from the transparent proxy in the current path that all of the one or more TCP connections involving the destination IP address that are proxied by the transparent proxy have ended or the switchover timer for the destination IP address has expired (block 740). In response, the AFC 160 transmits an instruction to an SDN controller 130 to configure the forwarding behavior of one or more switches 120 to forward the traffic destined for the destination IP address along the new path (block 750). Any new TCP connections involving the destination IP address can now be proxied by the new transparent proxy in the new path (or not proxied if the new path does not include a transparent proxy).

Figure 8A:
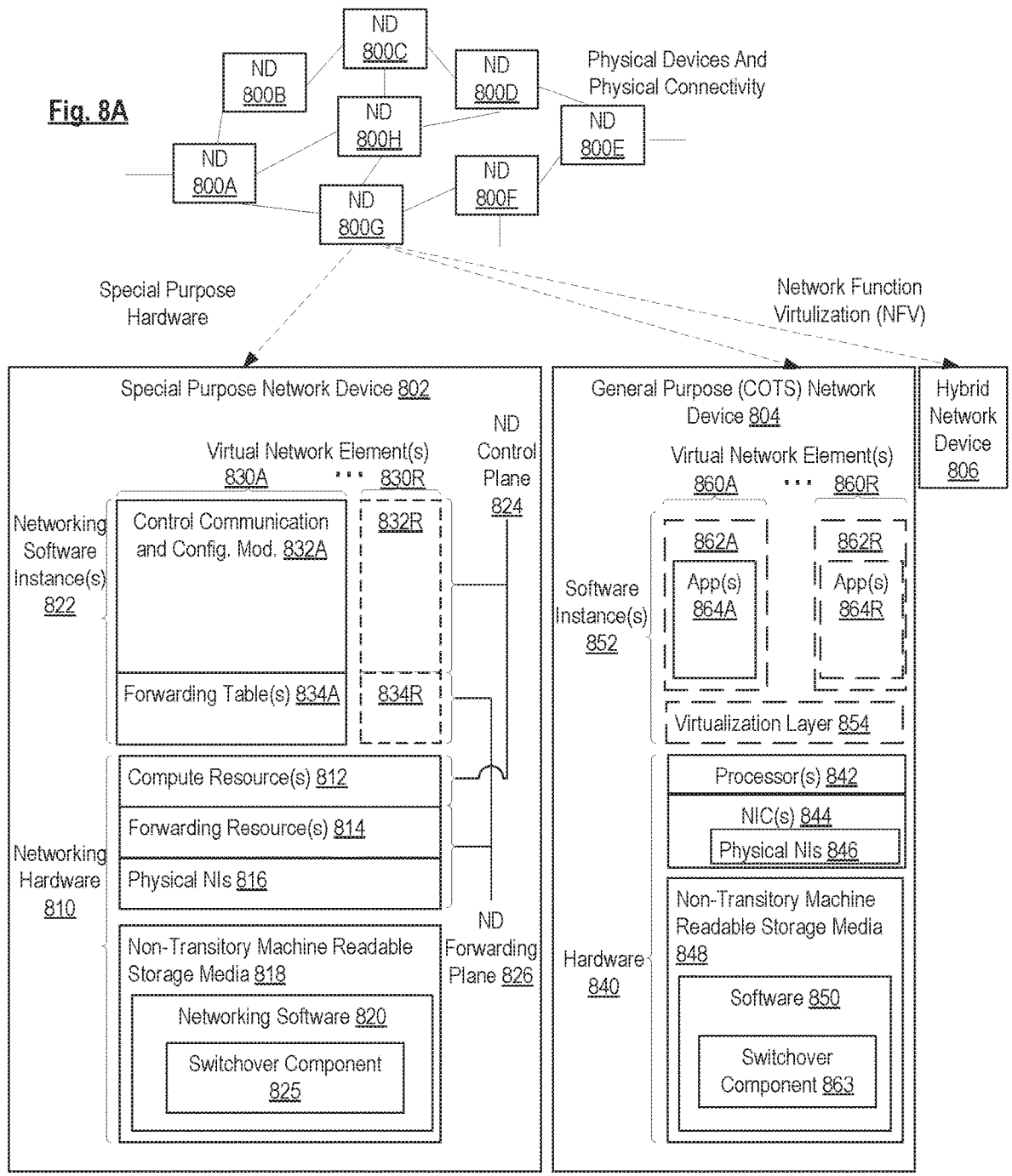
FIG. 8A illustrates connectivity between network devices (NDs) within an exemplary network, as well as three exemplary implementations of the NDs, according to some embodiments.

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

Software 820 can include code such as switchover component 825, which when executed by networking hardware 810, causes the special-purpose network device 802 to perform operations of one or more embodiments of the present invention as part networking software instances 822 (e.g., operations of a transparent proxy and/or AFC 160).

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

Figure 8B:
FIG. 8B illustrates an exemplary way to implement a special-purpose network device, according to some embodiments.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the NIC(s) 844, as well as optionally between the instances 862A-R; in addition, this virtual switch may enforce network isolation between the VNEs 860A-R that by policy are not permitted to communicate with each other (e.g., by honoring virtual local area networks (VLANs)).

Software 850 can include code such as switchover component 863, which when executed by processor(s) 842, cause the general purpose network device 804 to perform operations of one or more embodiments of the present invention as part software instances 862A-R (e.g., operations of a transparent proxy and/or AFC 160).

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
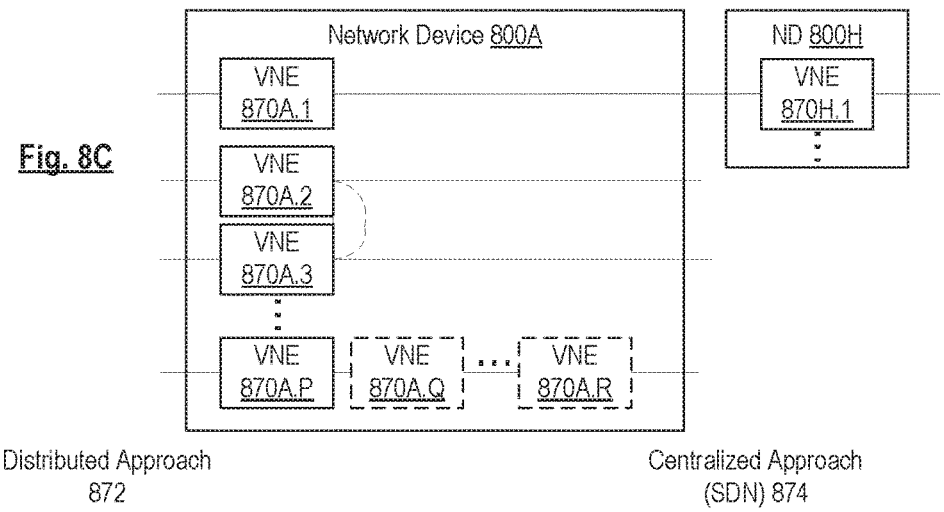
FIG. 8C illustrates various exemplary ways in which virtual network elements (VNEs) may be coupled, according to some embodiments.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-R may operate as servers; the same would be true for the hybrid network device 806; in the case of the special-purpose network device 802, one or more such servers could also be run on a virtualization layer executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
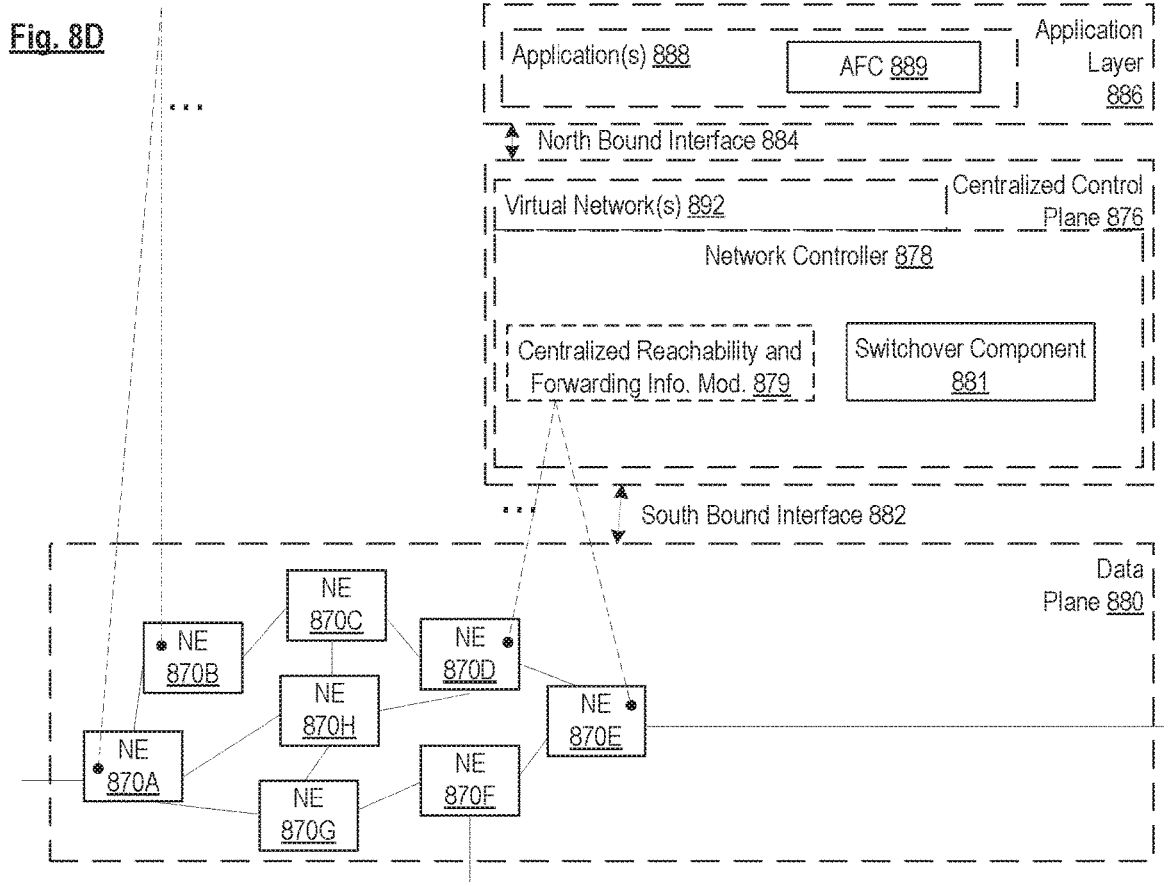
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 870A-H (e.g., the compute resource(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs. In one embodiment, the network controller 878 may include a switchover component 881 that when executed by the network controller 878, causes the network controller 878 to perform operations of one or more embodiments described herein above (e.g., operations of SDN controller 130).

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. The application(s) 888 may include an AFC application 889 that may be executed to perform operations of one or more embodiments of the present invention (e.g., operations of AFC 160). Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
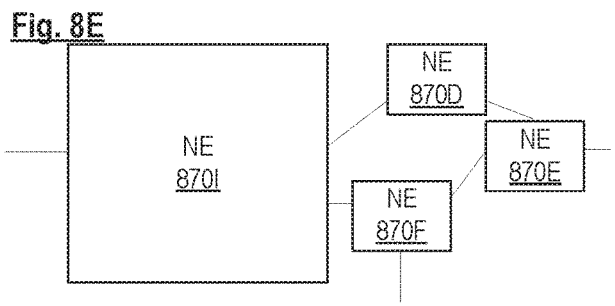
FIG. 8E illustrates the simple case of where each of the NDs implements a single NE, but a centralized control plane has abstracted multiple of the NEs in different NDs into (to represent) a single NE in one of the virtual network(s), according to some embodiments.
Figure 8F:
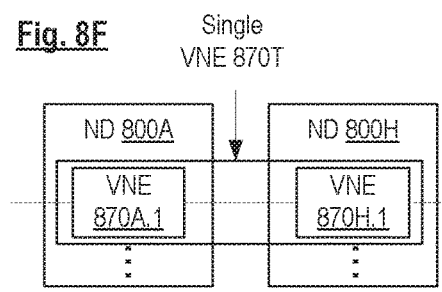
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments of the invention. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
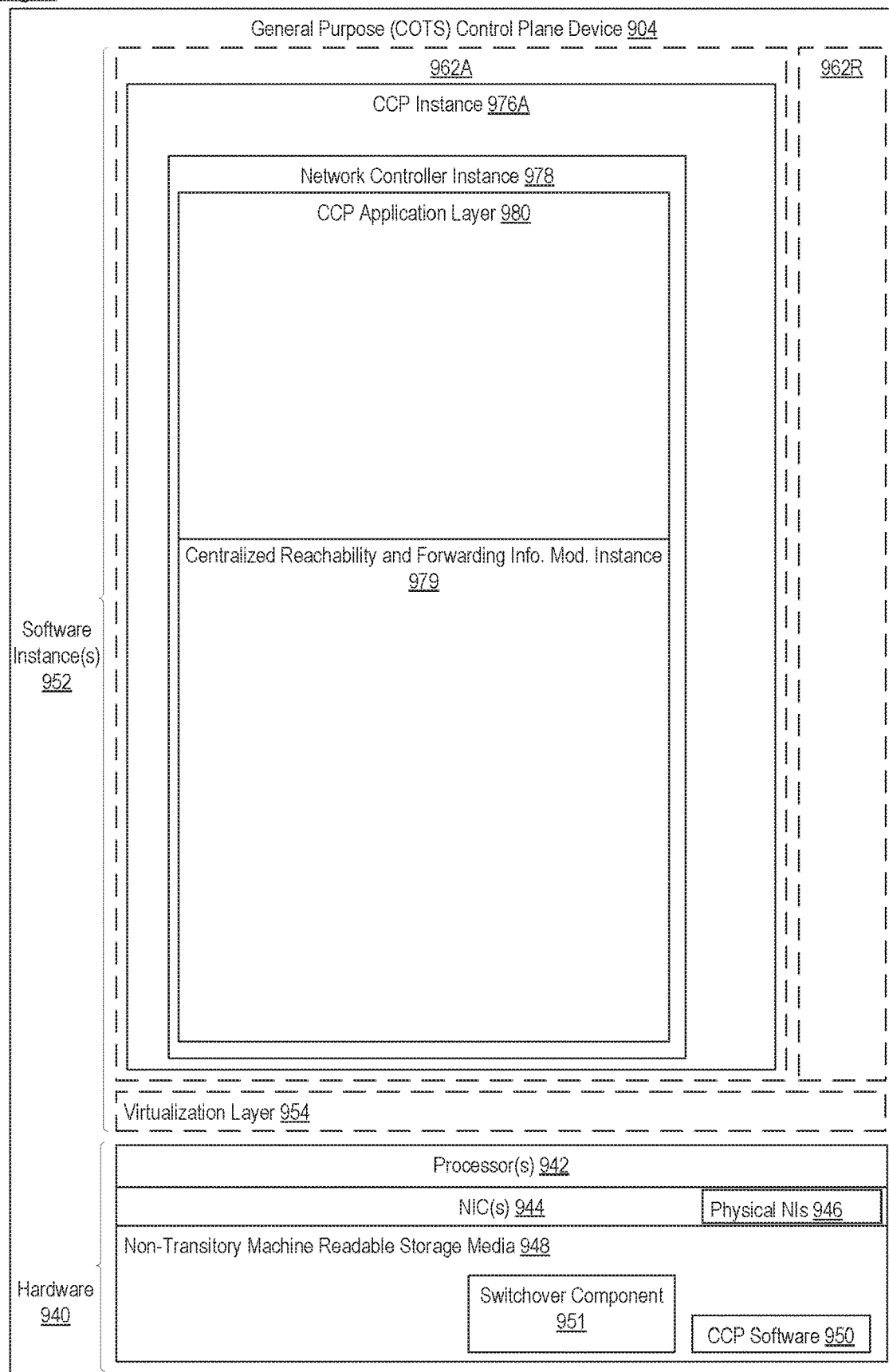
FIG. 9 illustrates a general purpose control plane device with centralized control plane (CCP) software, according to some embodiments.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein centralized control plane (CCP) software 950 and a switchover component 951.

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 940, directly on a hypervisor represented by virtualization layer 954 (in which case the unikernel is sometimes described as running within a LibOS virtual machine), or in a software container represented by one of instances 962A-R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user—interfaces). At a more abstract level, this CCP application layer 980 within the centralized control plane 876 works with virtual network view(s) (logical view(s) of the network) and the middleware layer provides the conversion from the virtual networks to the physical view.

The switchover component 951 can be executed by hardware 940 to perform operations of one or more embodiments of the present invention as part of software instances 952 (e.g., operations of SDN controller 130).

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a transparent proxy to support graceful switchover in a network, wherein the transparent proxy proxies one or more Transmission Control Protocol (TCP) connections involving a destination Internet Protocol (IP) address, the method comprising:
   receiving an instruction from an Application Flow Controller (AFC) to start a switchover timer for the destination IP address;
   starting the switchover timer for the destination IP address in response to receiving the instruction from the AFC to start the switchover timer for the destination IP address;
   determining whether all of the one or more TCP connections involving the destination IP address that are proxied by the transparent proxy have ended or the switchover timer for the destination IP address has expired; and
   transmitting an indication to the AFC that all of the one or more TCP connections involving the destination IP address that are proxied by the transparent proxy have ended or the switchover timer for the destination IP address has expired in response to a determination that all of the one or more TCP connections involving the destination IP address that are proxied by the transparent proxy have ended or the switchover timer for the destination IP address has expired.

2. The method of claim 1, further comprising:
   relaying one or more new TCP connections involving the destination IP address that are received after the switchover timer for the destination IP address has started.

3. The method of claim 2, wherein the relaying includes forwarding TCP segments for the one or more new TCP connections without performing transparent proxy functions, wherein the TCP segments include any one of a TCP handshake message, a TCP data message, and a TCP connection termination message.

4. The method of claim 1, further comprising:
   determining a number of the one or more TCP connections involving the destination IP address that are proxied by the transparent proxy that are alive, wherein the determining whether all of the one or more TCP connections involving the destination IP address that are proxied by the transparent proxy have ended is based on a determination that the number of the one or more TCP connections involving the destination IP address that are proxied by the transparent proxy that are alive is zero.

5. The method of claim 1, further comprising:
   terminating a TCP connection from the one or more TCP connections involving the destination IP address that are proxied by the transparent proxy when the switchover timer for the destination IP address expires.

6. The method of claim 1, further comprising:
   relaying a TCP connection that is received out of state without triggering a TCP reset of the TCP connection that is received out of state.

7. The method of claim 1, wherein the one or more TCP connections involving the destination IP address that are proxied by the transparent proxy employ a split TCP connection, wherein the split TCP connection includes a first TCP connection between a client network device and the transparent proxy and a second TCP connection between the transparent proxy and a server network device, wherein the server network device is associated with the destination IP address.

8. The method of claim 1, wherein the transparent proxy provides caching services or video compression services.

9. A method implemented by an Application Flow Controller (AFC) to initiate graceful switchover in a network, wherein a current path in the network to reach a destination Internet Protocol (IP) address includes a transparent proxy, wherein the transparent proxy proxies one or more Transmission Control Protocol (TCP) connections involving the destination IP address, the method comprising:
   transmitting an instruction to the transparent proxy in the current path to start a switchover timer for the destination IP address in response to a determination that traffic destined for the destination IP address is to take a new path that is different from the current path to reach the destination IP address;
   receiving an indication from the transparent proxy in the current path that all of the one or more TCP connections involving the destination IP address that are proxied by the transparent proxy have ended or the switchover timer for the destination IP address has expired; and
   transmitting an instruction to a Software Defined Networking (SDN) controller to configure a forwarding behavior of one or more switches to forward the traffic destined for the destination IP address along the new path in response to receiving the indication from the transparent proxy in the current path that all of the one or more TCP connections involving the destination IP address that are proxied by the transparent proxy have ended or the switchover timer for the destination IP address has expired.

10. The method of claim 9, further comprising:
sampling the traffic destined for the destination IP address, wherein the determination that the traffic destined for the destination IP address is to take the new path is based on an analysis of the sampled traffic and a pre-configured policy.

11. The method of claim 9, wherein the new path includes another transparent proxy that proxies TCP connections involving the destination IP address.

12. The method of claim 11, further comprising:
storing an indication of the another transparent proxy in the new path in response to a determination that the traffic destined for the destination IP address is to take the new path.

13. A network device to function as a transparent proxy to support graceful switchover in a network, wherein the transparent proxy proxies one or more Transmission Control Protocol (TCP) connections involving a destination Internet Protocol (IP) address, the network device comprising:
a set of one or more processors; and
a non-transitory machine-readable storage medium having stored therein a switchover component, which when executed by the set of one or more processors, causes the network device to receive an instruction from an Application Flow Controller (AFC) to start a switchover timer for the destination IP address, start the switchover timer for the destination IP address in response to receiving the instruction from the AFC to start the switchover timer for the destination IP address, determine whether all of the one or more TCP connections involving the destination IP address that are proxied by the transparent proxy have ended or the switchover timer for the destination IP address has expired, and transmit an indication to the AFC that all of the one or more TCP connections involving the destination IP address that are proxied by the transparent proxy have ended or the switchover timer for the destination IP address has expired in response to a determination that all of the one or more TCP connections involving the destination IP address that are proxied by the transparent proxy have ended or the switchover timer for the destination IP address has expired.

14. The network device of claim 13, wherein the switchover component, when executed by the set of one or more processors, further causes the network device to relay one or more new TCP connections involving the destination IP address that are received after the switchover timer for the destination IP address has started.

15. A network device to function as an Application Flow Controller (AFC) to initiate graceful switchover in a network, wherein a current path in the network to reach a destination Internet Protocol (IP) address includes a transparent proxy, wherein the transparent proxy proxies one or more Transmission Control Protocol (TCP) connections involving the destination IP address, the network device comprising:
a set of one or more processors; and
a non-transitory machine-readable storage medium having stored therein a switchover component, which when executed by the set of one or more processors, causes the network device to transmit an instruction to the transparent proxy in the current path to start a switchover timer for the destination IP address in response to a determination that traffic destined for the destination IP address is to take a new path that is different from the current path to reach the destination IP address, receive an indication from the transparent proxy in the current path that all of the one or more TCP connections involving the destination IP address that are proxied by the transparent proxy have ended or the switchover timer for the destination IP address has expired, and transmit an instruction to a Software Defined Networking (SDN) controller to configure a forwarding behavior of one or more switches to forward the traffic destined for the destination IP address along the new path in response to receiving the indication from the transparent proxy in the current path that all of the one or more TCP connections involving the destination IP address that are proxied by the transparent proxy have ended or the switchover timer for the destination IP address has expired.

16. The network device of claim 15, wherein the switchover component, when executed by the set of one or more processors, further causes the network device to sample the traffic destined for the destination IP address, wherein the determination that the traffic destined for the destination IP address is to take the new path is based on an analysis of the sampled traffic and a pre-configured policy.

17. A non-transitory machine-readable medium having computer code stored therein, which when executed by a set of one or more processors of a network device functioning as a transparent proxy, causes the network device to perform operations for supporting graceful switchover in a network, wherein the transparent proxy proxies one or more Transmission Control Protocol (TCP) connections involving a destination Internet Protocol (IP) address, the operations comprising:
receiving an instruction from an Application Flow Controller (AFC) to start a switchover timer for the destination IP address;
starting the switchover timer for the destination IP address in response to receiving the instruction from the AFC to start the switchover timer for the destination IP address;
determining whether all of the one or more TCP connections involving the destination IP address that are proxied by the transparent proxy have ended or the switchover timer for the destination IP address has expired; and
transmitting an indication to the AFC that all of the one or more TCP connections involving the destination IP address that are proxied by the transparent proxy have ended or the switchover timer for the destination IP address has expired in response to a determination that all of the one or more TCP connections involving the destination IP address that are proxied by the transparent proxy have ended or the switchover timer for the destination IP address has expired.

18. The non-transitory machine-readable medium of claim 17, wherein the computer code, when executed by the set of one or more processors of the network device, causes the network device to perform further operations comprising:
determining a number of the one or more TCP connections involving the destination IP address that are proxied by the transparent proxy that are alive, wherein the determining whether all of the one or more TCP connections involving the destination IP address that are proxied by the transparent proxy have ended is based on a determination that the number of the one or more TCP connections involving the destination IP address that are proxied by the transparent proxy that are alive is zero.

19. A non-transitory machine-readable medium having computer code stored therein, which when executed by a set of one or more processors of a network device functioning as an Application Flow Controller (AFC), causes the network device to perform operations for initiating graceful switchover in a network, wherein a current path in the network to reach a destination Internet Protocol (IP) address includes a transparent proxy, wherein the transparent proxy proxies one or more Transmission Control Protocol (TCP) connections involving the destination IP address, the operations comprising:

transmitting an instruction to the transparent proxy in the current path to start a switchover timer for the destination IP address in response to a determination that traffic destined for the destination IP address is to take a new path that is different from the current path to reach the destination IP address;

receiving an indication from the transparent proxy in the current path that all of the one or more TCP connections involving the destination IP address that are proxied by the transparent proxy have ended or the switchover timer for the destination IP address has expired; and transmitting an instruction to a Software Defined Networking (SDN) controller to configure a forwarding behavior of one or more switches to forward the traffic destined for the destination IP address along the new path in response to receiving the indication from the transparent proxy in the current path that all of the one or more TCP connections involving the destination IP address that are proxied by the transparent proxy have ended or the switchover timer for the destination IP address has expired.

20. The non-transitory machine-readable medium of claim 19, wherein the new path includes another transparent proxy that proxies TCP connections involving the destination IP address.

\* \* \* \* \*